(12) United States Patent
Xu et al.

(10) Patent No.: US 11,485,063 B2
(45) Date of Patent: Nov. 1, 2022

(54) COUNTER-ROTATING DIFFERENTIAL SPEED EXTRUSION DEVICE, EXTRUDER AND METHOD FOR MANUFACTURING MATERIALS

(71) Applicant: Wuyi University, Jiangmen (CN)

(72) Inventors: Baiping Xu, Jiangmen (CN); Huiwen Yu, Jiangmen (CN); Shuping Xiao, Jiangmen (CN); Yaoxue Du, Jiangmen (CN)

(73) Assignee: Wuyi University, Jiangmen (CN)

( * ) Notice: Subject to any disclaimer, the term of this patent is extended or adjusted under 35 U.S.C. 154(b) by 149 days.

(21) Appl. No.: 17/007,886

(22) Filed: Aug. 31, 2020

(65) Prior Publication Data
US 2021/0308929 A1   Oct. 7, 2021

(30) Foreign Application Priority Data

Mar. 25, 2020   (CN) .......................... 202010216298.5

(51) Int. Cl.
*B29C 48/41* (2019.01)
*B29C 48/65* (2019.01)
(Continued)

(52) U.S. Cl.
CPC ............ *B29C 48/41* (2019.02); *B29C 48/425* (2019.02); *B29C 48/535* (2019.02); *B29C 48/59* (2019.02); *B29C 48/65* (2019.02)

(58) Field of Classification Search
CPC ....... B29C 48/41; B29C 48/535; B29C 48/59; B29C 48/65
See application file for complete search history.

(56) References Cited

U.S. PATENT DOCUMENTS 2,698,962 A * 1/1955 Swallow ................. B29C 48/40
425/204
3,104,420 A * 9/1963 Werner ................... B29C 48/53
366/85
(Continued)

FOREIGN PATENT DOCUMENTS

CN    101020357 A    8/2007
CN    102275286 A   12/2011
(Continued)

OTHER PUBLICATIONS

Wei, Jing, Li Guo, and Guang Hui Zhang. "Profiles Design, Optimization, and Geometric Analysis of Rotors of a Novel Continuous Kneader Reactor." Journal of reinforced plastics and composites 29.15 (2010): 2279-2295. (Year: 2010).*
(Continued)

*Primary Examiner* — Galen H Hauth
(74) *Attorney, Agent, or Firm* — Vivacqua Crane, PLLC

(57) ABSTRACT

A counter-rotating differential speed extrusion device includes a barrel and a screw mechanism in the barrel comprising a first and second screws. A crest diameter and a root diameter of the first screw are respectively meshed with that of the second screw; the first and second screws counter-rotate in differential speeds at a fixed rotation speed ratio; at least one first intermediate circular arc structure with a trend consistent with that of the crest diameter and the root diameter of the first screw is provided between the root diameter and the crest diameter of the first screw, a second intermediate circular arc structure tangent to the first intermediate circular arc structure and having a trend consistent with that of the root diameter and the crest diameter of the second screw is provided between the root diameter and the crest diameter of the second screw.

9 Claims, 6 Drawing Sheets

(51) Int. Cl.
*B29C 48/425* (2019.01)
*B29C 48/59* (2019.01)
*B29C 48/535* (2019.01)

(56) References Cited

U.S. PATENT DOCUMENTS

| | | |
|---|---|---|
| 3,501,807 A | 3/1970 | Selbach |
| 2004/0126453 A1 | 7/2004 | Dray |
| 2008/0181051 A1 | 7/2008 | Yamaguchi et al. |
| 2010/0143523 A1 | 6/2010 | Chang |

FOREIGN PATENT DOCUMENTS

| | | |
|---|---|---|
| CN | 103862654 A | 6/2014 |
| CN | 206840670 U | 1/2018 |
| CN | 108016018 A | 5/2018 |
| CN | 110116488 A | 8/2019 |
| FR | 1533698 A | 7/1968 |
| JP | H0557725 U | 7/1993 |
| JP | H0613174 B2 | 2/1994 |
| JP | H11253778 A | 9/1999 |
| JP | 2004338343 A | 12/2004 |
| SU | 1634511 A2 | 3/1991 |

OTHER PUBLICATIONS

Giles Jr, Harold F., Eldridge M. Mount III, and John R. Wagner Jr. Extrusion: the definitive processing guide and handbook. William Andrew, 2004. (Year: 2004).*
European Patent Office. Extended European Search Report and Opinion for EP Application No. 20193657.2, dated Feb. 12, 2021, pp. 1-7.
The State Intellectual Property Office of People's Republic of China. Search Report for CN2020102162985 and English translation dated Jun. 6, 2021, pp. 1-6.
The State Intellectual Property Office of People's Republic of China. First Office Action for CN Application No. 2020102162985 and English translation, dated Jun. 9, 2021, pp. 1-12.
Bianying, Wen. Polymer material processing, China Light Industry Press, p. 87-92, China.

* cited by examiner

COUNTER-ROTATING DIFFERENTIAL SPEED EXTRUSION DEVICE, EXTRUDER AND METHOD FOR MANUFACTURING MATERIALS

CROSS-REFERENCE TO RELATED APPLICATIONS

This application is based on and claims the benefit of priority from Chinese Patent Application No. 2020102162985, filed on 25 Mar. 2020, the entirety of which is incorporated by reference herein.

TECHNICAL FIELD

The present disclosure relates to the field of multi-screw extruders, and in particular relates to a counter-rotating differential speed extrusion device, an extruder and a method for manufacturing materials.

BACKGROUND

Co-rotating multi-screw extruder and counter-rotating multi-screw extruder mainly include a barrel and multiple screws installed in an inner cavity of the barrel, where, intermeshing counter-rotating twin-screw extruder is the most widely used in counter-rotating multi-screw extruder. The traditional counter-rotating twin-screw extruder adopts the working mode of two screws rotating in opposite directions at the same speed, the materials is enclosed in several independent C-shaped chambers and pushed towards the outlet, thus the traditional counter-rotating twin-screw extruder has good pressure-building ability, thus is widely used in the extrusion molding process.

Currently, in order to change the mixing and melting efficiency in the meshing zone, differential speed counter-rotating twin screws have appeared. Referring to FIG. 1, the differential speed counter-rotating twin screws strengthens the dispersion and mixing effect by introducing a larger speed difference in the meshing zone, but the fact that the materials is still enclosed in several independent C-shaped chambers has not changed, there is still no mixing relationship between different screws and between the upstream and downstream of the screw, which has led to a limited effect on mixing. In such a screw configuration, through meshing displacement relationship, the C-shaped chamber is pushed axially from the inlet to the outlet, and the materials is enclosed in the same C-shaped chamber to complete the melting, mixing and exhausting process. The upstream and downstream of the screw lack the adaptive mechanism of the melting process, when the output increases, it is easy to cause unmelted solid materials to block the screw channel, resulting in a significant increase in energy consumption.

SUMMARY

The present disclosure aims to address at least one of the technical problems existing in the prior art. For this purpose, the present disclosure proposes a counter-rotating differential speed extrusion device. The counter-rotating differential speed extrusion device has a simple structure, thus improves the melting and mixing effect, and solves the problem of solid materials blocking the screw channel. The present disclosure also proposes a counter-rotating extruder and a method for manufacturing materials.

According to an embodiment of a first aspect of the present disclosure, a counter-rotating differential speed extrusion device includes a barrel and a screw mechanism arranged in the barrel, the screw mechanism includes a first screw and a second screw, wherein a crest diameter and a root diameter of the first screw are respectively meshed with a root diameter and a crest diameter of the second screw; the first screw and the second screw counter-rotate in differential speeds at a fixed rotation speed ratio; at least one first intermediate circular arc structure is provided between the root diameter and the crest diameter of the first screw, a second intermediate circular arc structure that is tangent to the first intermediate circular arc structure is provided between the root diameter and the crest diameter of the second screw; a trend of the first intermediate circular arc structure is consistent with a trend of the crest diameter and the root diameter of the first screw; a trend of the second intermediate circular arc structure is consistent with a trend of the root diameter and the crest diameter of the second screw.

The counter-rotating differential speed extrusion device according to the embodiment of the present disclosure has at least the following technical effects: the first screw and the second screw rotate in different directions to achieve mutual wiping between the two screws, and achieve self-cleaning during processing; through the first intermediate circular arc structure provided between the root diameter and the crest diameter of the first screw and the second intermediate circular arc structure provided between the root diameter and the crest diameter of the second screw, the two screw grooves are open to each other, the original closed C-shaped chamber positive displacement conveying unit is expanded to "8"-shaped chamber positive displacement conveying unit, which can effectively strengthen the melt plasticization and also have a more stable pressure-building ability. And by controlling the number of the first intermediate circular arc structure and the second intermediate circular arc to adjust the degree of axial opening or closing in the meshing zone, therefore, the ratio of frictional conveying and positive displacement conveying can be adjusted to control the pressure-building ability and extrusion characteristics of the screw structure. In addition, the first screw and the second screw form a local mixing and kneading pool in the upper and lower meshing zones, and the unmelted materials advances at a faster speed than the melt under the action of positive displacement movement, and participates in the stirring process, thereby strengthening the melting and mixing, forming an adaptive melting mechanism, effectively improving the processing flexibility of the screws.

According to some embodiments of the present disclosure, the rotation speed ratio of the first screw and the second screw is $N_1/N_2$, and $N_1$ and $N_2$ are positive integers that are relatively prime, in each cross section of the screw mechanism, a cross-sectional profile of the first screw and a cross-sectional profile of the second screw include multiple continuous curved arcs, and a number ratio of the curved arcs of the cross-sectional profile of the first screw and the curved arcs of the cross-sectional profile of the second screw is inversely proportional to the rotation speed ratio.

According to some embodiments of the present disclosure, the first intermediate circular arc structure is provided on both sides of the crest diameter of the first screw, the second intermediate circular arc structure is provided on both sides of the crest diameter of the second screw; the cross-sectional profile of the first screw is composed of $8N_2$ curved arcs; the cross-sectional profile of the second screw is composed of $8N_1$ curved arcs;

the $8N_2$ curved arcs of the cross-sectional profile of the first screw includes $N_2$ circular arcs AB, $N_2$ circular arcs EF, $2N_2$ circular arcs CD, and $2N_2$ non-circular arcs ED connecting circular arc EF and circular arc CD, $2N_2$ non-circular arcs CB connecting circular arc CD and circular arc AB; diameters corresponding to AB, CD and EF are R, $r_M$ and r, and central angles corresponding to AB, CD and EF are $\alpha$, $\beta$, and $\gamma$, respectively, parameters $\varnothing_1, \varnothing_2$ are given, then $\varnothing_1, \varnothing_2$ satisfy the following relational expressions:

$$\varnothing_1 = \frac{N_1}{N_2}\arccos\left(\frac{C^2 + R^2 - r_M^2}{2CR}\right) - acrsin\frac{\sqrt{4C^2R^2 - (C^2 + R^2 - r_M^2)^2}}{2Cr_M},$$

$$\varnothing_2 = \frac{N_1}{N_2}arcos\left(\frac{(C+R)r + (C-r_M)^2}{2C(C-r_M)}\right) - acrsin\frac{\sqrt{4C^2(C-r_M)^2 - (C^2 - R^2 + (C-r_M)^2)^2}}{2CR},$$

the central angles $\alpha$, $\beta$, and $\gamma$ satisfy the following relational expression:

$$\alpha + 2\beta + \gamma = \frac{2\pi}{N_2} - 2\varnothing_1 - 2\varnothing_2.$$

$8N_1$ curved arcs of the cross-sectional profile of the second screw includes $N_1$ circular arcs $A_1B_1$, $N_1$ circular arcs $E_1F_1$, $2N_1$ circular arcs $C_1D_1$, $2N_1$ non-circular arcs $E_1D_1$ connecting circular arcs $E_1F_1$ and circular arcs $C_1D_1$, $2N_2$ non-circular arcs $C_1B_1$ connecting circular arcs $C_1D_1$ and circular arcs $A_1B_1$, diameters corresponding to $A_1B_1$, $C_1D_1$ and $E_1F_1$ are R, $C-r_M$ and r, central angles corresponding to $A_1B_1$, $C_1D_1$ and $E_1F_1$ are respectively $$\frac{\alpha N_2}{N_1}, \frac{\beta N_2}{N_1} \text{ and } \frac{\gamma N_2}{N_1}.$$

According to some embodiments of the present disclosure, the first intermediate circular arc structure is provided on one side of the crest diameter of the first screw, the second intermediate circular arc structure is provided on a side of the crest diameter of the second screw corresponding to the first intermediate circular arc structure; the cross-sectional profile of the first screw is composed of $6N_2$ curved arcs; the cross-sectional profile of the second screw is composed of $6N_1$ curved arcs;

$6N_2$ circular arcs of the cross-sectional profile of the first screw includes $N_2$ circular arcs AB, $N_2$ circular arcs EF, $N_2$ circular arcs CD, $N_2$ non-circular arcs ED connecting circular arc EF and circular arc CD, $N_2$ non-circular arcs CB connecting circular arc CD and circular arc AB, $N_2$ non-circular arcs FA connecting circular arc EF and circular arc AB; diameters corresponding to AB, CD and EF are R, $r_M$ and r, and central angles corresponding to AB, CD and EF are $\alpha$, $\beta$, and $\gamma$, respectively, parameters $\varnothing_1$、$\varnothing_2$、$\varnothing_3$ are given, then $\varnothing_1$、$\varnothing_2$、$\varnothing_3$ satisfy the following relational expression:

$$\varnothing_1 = \frac{N_1}{N_2}\arccos\left(\frac{C^2 + R^2 - r_M^2}{2CR}\right) - acrsin\frac{\sqrt{4C^2R^2 - (C^2 + R^2 - r_M^2)^2}}{2Cr_M},$$

$$\varnothing_2 = \frac{N_1}{N_2}arcos\left(\frac{(C+R)r + (C-r_M)^2}{2C(C-r_M)}\right) -$$

$$acrsin\frac{\sqrt{4C^2(C-r_M)^2 - (C^2 - R^2 + (C-r_M)^2)^2}}{2CR},$$

$$\varnothing_3 = \frac{N_1}{N_2}arcos\left(\frac{C}{2R}\right) - acrsin\frac{\sqrt{4R^2 - C^2}}{2R},$$

the central angles $\alpha$, $\beta$, and $\gamma$ satisfy the following relational expression:

$$\alpha + \beta + \gamma = \frac{2\pi}{N_2} - \varnothing_1 - \varnothing_2 - \varnothing_3.$$

$6N_1$ curved arcs of the cross-sectional profile of the second screw include $N_1$ circular arcs $A_1B_1$, $N_1$ circular arcs $E_1F_1$, $N_1$ circular arcs $C_1D_1$, $N_1$ non-circular circular arcs $E_1D_1$ connecting circular arcs $E_1F_1$ and circular arcs $C_1D_1$, $N_2$ non-circular circular arcs $C_1B_1$ connecting circular arcs $C_1D_1$ and circular arcs $A_1B_1$, $N_1$ non-circular arcs $F_1A_1$ connecting arcs $E_1F_1$ and arcs $A_1B_1$, diameters corresponding to $A_1B_1$, $C_1D_1$ and $E_1F_1$ are R, $C-r_M$ and r, central angles corresponding to $A_1B_1$, $C_1D_1$ and $E_1F_1$ are respectively $$\frac{\alpha N_2}{N_1}, \frac{\beta N_2}{N_1} \text{ and } \frac{\gamma N_2}{N_1}.$$

According to some embodiments of the present disclosure, the crest diameters of the first screw and the second screw are both tangent to a wall of an inner cavity of the barrel.

According to some embodiments of the present disclosure, the screw mechanism sequentially divides the inner cavity of the barrel into a conveying section, a melting section, an exhaust section, and a mixing and extrusion section; the barrel is provided with a feed port corresponding to the conveying section, an exhaust port corresponding to the exhaust section, a discharge port corresponding to an end of the mixing and extrusion section.

According to some embodiments of the present disclosure, the screw mechanism further includes a third screw having a same structure as the first screw, the third screw and the second screw are meshed with each other; the third screw and the first screw have a same rotating direction.

According to some embodiments of the present disclosure, both the first screw and the second screw adopt a tapered structure.

According to an embodiment of a second aspect of the present disclosure, a counter-rotating extruder includes the counter-rotating differential speed extrusion device of any one of the above embodiment.

The counter-rotating extruder according to the embodiment of the present disclosure has at least the following technical effects: the counter-rotating differential speed extrusion device realizes the self-cleaning during processing and enhances the disturbance effect, thus can effectively strengthen the melt plasticization and also have a more stable pressure building capability. In addition, through the counter-rotating differential speed extrusion device, the unmelted materials can be pushed forward at a faster speed than the melt under the action of positive displacement movement, and participates in the stirring process, thereby strengthening the melting and mixing, forming an adaptive melting mechanism, effectively improving the processing flexibility of the screw.

According to an embodiment of a third aspect of the present disclosure, a method for manufacturing materials includes: adding materials; counter-rotating the first screw and the second screw in differential speeds rotational speed, and advancing the materials through the first screw and the second screw; melting the materials by heat generated by the rotation of the first screw and the second screw and external heating to make the materials form a melt; stretching, compressing and kneading the melt through the first screw, the second screw, and the barrel to form a final target product.

The method for manufacturing materials according to the embodiment of the present disclosure has at least the following technical effects: through the counter rotation of the first screw and the second screw, materials can be automatically pushed forward, at the same time, because of the specificity of the first screw and the second screw, the unmelted materials can be pushed forward along the groove axis at a faster speed than the melt under the action of positive displacement movement, and participates in the stirring process, thereby strengthening the plasticization and mixing and make the extrusion of the melted materials stable. At the same time, the differential rotation between the first screw and the second screw also achieves better self-cleaning.

Additional aspects and advantages of the present disclosure will be partially given in the following description, and some will become apparent from the following description, or can be learned through the practice of the present disclosure.

BRIEF DESCRIPTION OF THE DRAWINGS

The above and/or additional aspects and advantages of the present disclosure will become apparent and easily understood from the description of the embodiments in conjunction with the following drawings, in which.

LIST OF REFERENCE NUMBERS

Figure 1:
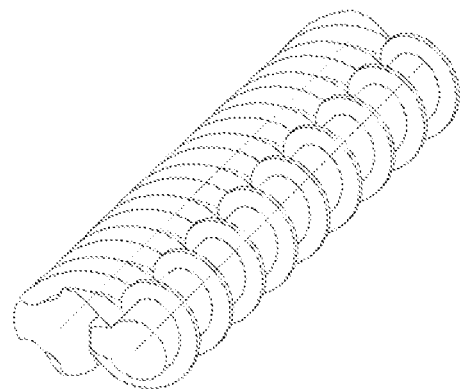
FIG. 1 is a schematic structural view of a conventional counter-rotating differential speed twin screw with a rotation speed ratio of 3:1.

Barrel 100,
Conveying section 110,
Feed port 111,
Melting section 120,
Exhaust section 130,
Exhaust port 131,
Mixing and extrusion section 140,
Discharge port 141,
Screw mechanism 200,
First screw 210,
First intermediate circular arc structure 211,
Second screw 220,
Second intermediate circular arc structure 221,
Flow channel 300.

DETAILED DESCRIPTION

The following describes in detail embodiments of the present disclosure, examples of which are shown in the drawings, wherein the same or similar reference numbers indicate the same or similar elements or elements with the same or similar functions throughout. The embodiments described below with reference to the drawings are exemplary and are only used to explain the present disclosure, and cannot be construed as limiting the present disclosure.

In the description of the present disclosure, the terms such as first, second, third, fourth, if described, are just for the purpose of distinguishing technical features, it cannot be understood as indicating or implying relative importance or implicitly indicating the number of indicated technical features or impliedly indicating the sequence of indicated technical features.

In the description of the present disclosure, unless otherwise clearly defined, words such as arranging and connecting should be understood in a broad sense, and those skilled in the art can reasonably determine the specific meaning of the above words in the present disclosure in conjunction with the specific content of the technical solution.

Hereinafter, a counter-rotating differential speed extrusion device according to an embodiment of the first aspect of the present disclosure will be described with reference to FIGS. 1 to 12.

According to an embodiment of the first aspect of the present disclosure, a counter-rotating differential speed extrusion device includes: a barrel 100 and a screw mechanism 200 arranged in the barrel 100, the screw mechanism 200 includes a first screw 210 and a second screw 220, wherein a crest diameter and a root diameter of the first screw 210 are respectively meshed with a root diameter and a crest diameter of the second screw 220; the first screw 210 and the second screw 220 counter-rotate in differential speeds at a fixed rotation speed ratio; at least one first intermediate circular arc structure 211 is provided between the root diameter and the crest diameter of the first screw 210, a second intermediate circular arc structure 221 that is tangent to the first intermediate circular arc structure 211 is provided between the root diameter and the crest diameter of the second screw 220; a trend of the first intermediate circular arc structure 211 is consistent with a trend of the crest diameter and the root diameter of the first screw 210; a trend of the second intermediate circular arc structure 221 is consistent with a trend of the root diameter and the crest diameter of the second screw 220.

Figure 2:
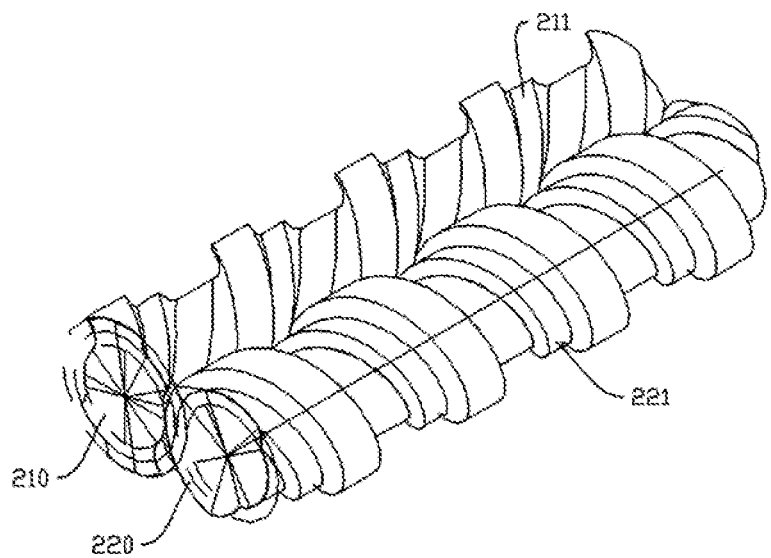
FIG. 2 is a schematic structural view of a twin screw with an axially closed screw groove and a rotation speed ratio of 2:1 (except the barrel) according to an embodiment of the first aspect of the present disclosure.
Figure 3:
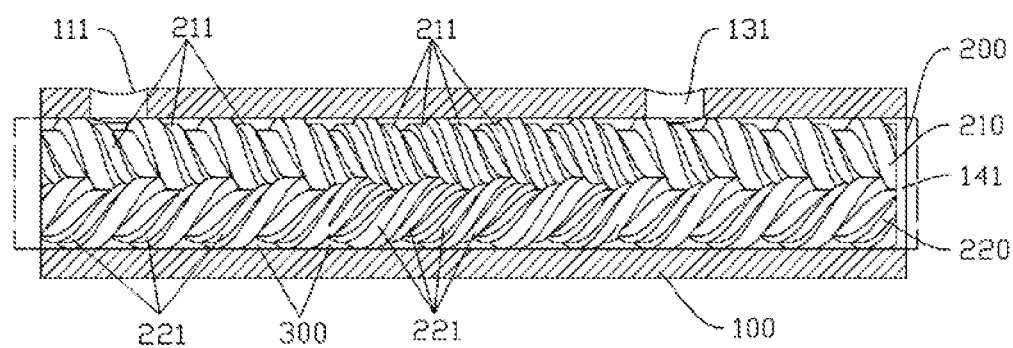
FIG. 3 is a schematic structural view of a twin screw with a rotation speed ratio of 2:1 according to an embodiment of the first aspect of the present disclosure.
Figure 4:
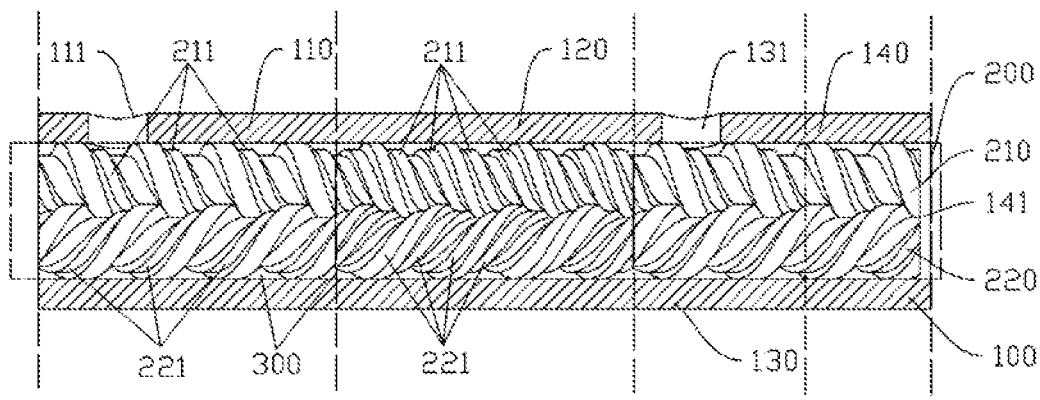
FIG. 4 is a schematic sectional view of the extrusion device shown in FIG. 3.

Referring to FIGS. 2 to 4, the crest diameter and the root diameter of the first screw 210 and the root diameter and the crest diameter of the second screw 220 are always in a state of intermeshing with each other, the first intermediate circular arc structure 211 and the second intermediate circular arc structure 221 also need to maintain a state of being always tangent. The number of the first intermediate circular arc structures 211 and the number of the second intermediate circular arc structures 221 may be multiple according to the difference in the rotation speed ratio. The first intermediate circular arc structure 211 may be disposed on one side or both sides of the crest diameter of the first screw 210, and the second intermediate circular arc structure 221 is also disposed on one side or both sides of the crest diameter of the second screw 220. When the existence states (whether it exists on both sides or one side of the crest diameter) and the number of the first intermediate circular arc structure 211 and the second intermediate circular arc structure 221 are changed, it is possible to adjust the axial opening and closing of the upstream and downstream screw grooves, thereby changing the axial mixing capacity and meeting different mixing capacity requirements. For example, when the crest diameter of the first screw 210 is connected with the first intermediate circular arc structure 211 on both sides, and the crest diameter of the second screw 220 is connected with the second intermediate circular arc structure 221 on both sides, a structure in which the screw groove is axially fully opened can be realized, thus increasing the axial mixing and adaptive melting ability, when the crest diameter of the first screw 210 is connected with the first intermediate circular arc structure 211 on only one side, and the crest diameter of the second screw 220 is connected with the second intermediate circular arc structure 221 on only one side, a structure in which the screw groove is axially closed can be realized, which can effectively improve the positive displacement conveying capacity. With further reference to FIGS. 3 and 4, the device in FIGS. 3 and 4 includes a conveying section 110 with an axially closed screw groove structure, a melting section 120 with an axially fully open screw groove structure, an exhaust section 130 with an axially closed screw groove structure, and a mixing and extrusion section 140 with an axially closed screw groove structure, which can ensure that the extruder can play a best role in each section.

At the same time, the existence of the first intermediate circular arc structure 211 and the second intermediate circular arc structure 221 will communicate the original left and right C-shaped chambers formed after the first screw 210 and the second screw 220 are meshed, and expanding to an overall "8"-shaped chamber, increasing a mixing effect. The first screw 210 and the second screw 220 always counter-rotate in differential rotation speed, so that the surfaces of the first screw 210 and the second screw 220 can be wiped with each other to achieve a self-cleaning effect. In addition, after the first screw 210 and the second screw 220 are meshed, an upper meshing zone and a lower meshing zone are also formed, and local mixing and kneading pools are formed in the upper and lower meshing zones. In some embodiments, the root diameter and crest diameter of the first screw 210 and the second screw 220 and the first intermediate circular arc structure 211 and the second intermediate circular arc structure 221 generally adopt a smooth spiral rib structures.

In the counter-rotating differential speed extrusion device according to the embodiment of the present disclosure, the first screw 210 and the second screw 220 counter-rotate in differential speeds to wipe each other and realize the self-cleaning during the processing. Through the first intermediate circular arc structure 211 provided between the root diameter and crest diameter of the first screw 210 and the second intermediate circular arc structure 221 provided between the root diameter and crest diameter of the second screw 220, the two screw grooves are opened to each other, the original closed C-shaped chamber positive displacement conveying unit is expanded to "8"-shaped chamber positive displacement conveying unit, which can effectively strengthen the melt plasticization and also have a more stable pressure-building ability. And by controlling the number of the first intermediate circular arc structure 211 and the second intermediate circular arc to adjust the axial opening or closing degree in the meshing zone, therefore, the ratio of frictional conveying and positive displacement conveying can be adjusted to control the pressure-building ability and extrusion characteristics of the screw structure. In addition, the first screw 210 and the second screw 220 form a local mixing and kneading pool in the upper and lower meshing zones, and the unmelted materials advances at a faster speed than the melt under the action of positive displacement movement, and participates in the stirring process, thus the melting and mixing are strengthened to form an adaptive melting mechanism, which effectively improves the processing flexibility of the screws.

Figure 5:
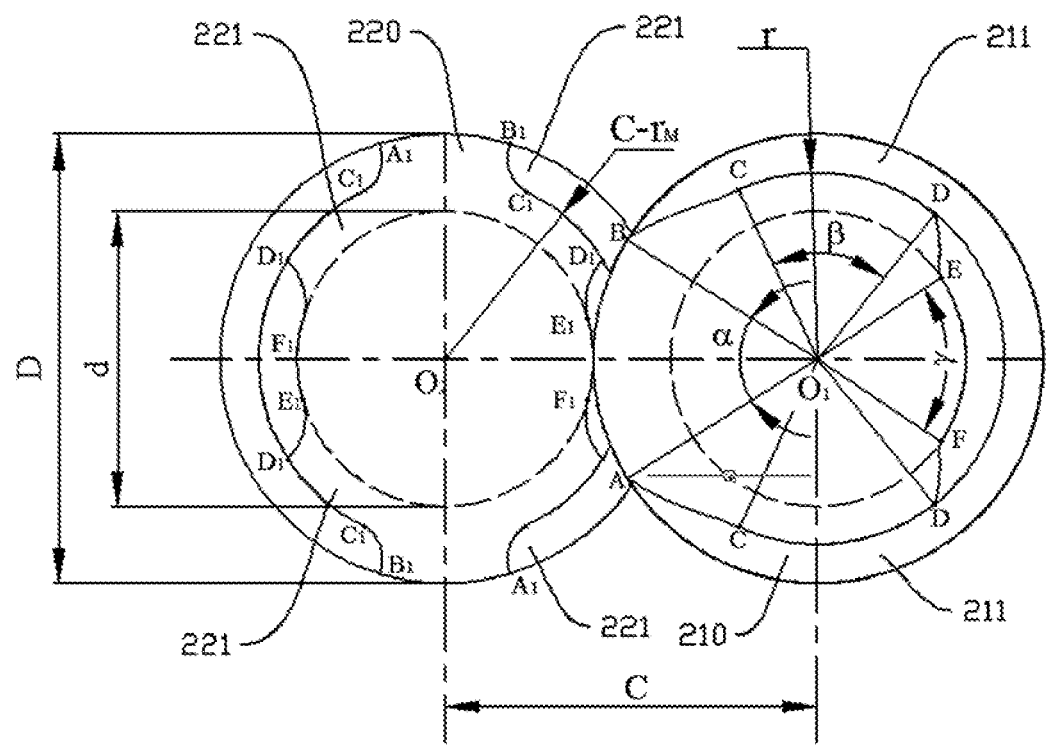
FIG. 5 is a schematic view of the cross-sectional profile of an extrusion device (except the barrel) with a rotation speed ratio of 2:1 and an axially fully open screw groove according to an embodiment of the first aspect of the present disclosure.

According to some embodiments of the present disclosure, the rotation speed ratio of the first screw and the second screw is $N_1/N_2$, and $N_1$ and $N_2$ are positive integers that are relatively prime. In each cross section of the screw mechanism 200, a cross-sectional profile of the first screw 210 and a cross-sectional profile of the second screw 220 include multiple continuous curved arcs, and a number ratio of the curved arcs in the cross-sectional profile of the first screw 210 and the curved arcs in the cross-sectional profile of the second screw 220 is inversely proportional to the rotation speed ratio. The rotation speed ratio of the first screw 210 and the second screw 220 is $N_1/N_2$, and $N_1$ and $N_2$ are positive integers that are relatively prime, according to the principle of meshing conjugate, the number of threads of the first screw 210 and the second screw 220 are $N_2$ and $N_1$, respectively. The number of threads here can be understood as: in the cross-sectional profile of the first screw 210 and the second screw 220 at the same place of the screw mechanism 200, the number of curved arcs included in the cross-sectional profile of the first screw 210 with a diameter equal to the crest diameter of the first screw 210 is $N_2$, the number of curved arcs included in the cross-sectional profile of the second screw 220 with a corresponding diameter equal to the crest diameter of the second screw 220 is $N_1$. Usually in actual engineering, the rotation speed ratio will be set to an integer ratio as much as possible, which can facilitate the design and manufacture of the extrusion device, as well as the calculation of performance. Meanwhile, generally, after the rotation speed ratio is determined, the cross-sectional profiles of the first screw 210 and the second screw 220 are also basically determined. Referring to FIG. 5, a typical cross-sectional profile is selected here, it can be found that the cross-sectional profiles of the first intermediate circular arc structure 211 and the second intermediate circular arc structure 221 are not a standard arc, but a continuous multi-section curved arc. The continuous multi-section curved arc structure can ensure that the first intermediate circular arc structure 211 and the second intermediate circular arc structure 221 open the first screw 2102 and the second screw 220 in left and right sides at the same time while ensuring a high effect of strengthening melting and mixing. The numbers of circular arcs and non-circular arcs in the cross-sectional profiles of the first screw 210 and the second screw 220 need to be determined according to $N_1$, $N_2$, generally, the larger $N_1$ and $N_2$ are, the more the corresponding arcs and non-circular arcs are.

Figure 7:
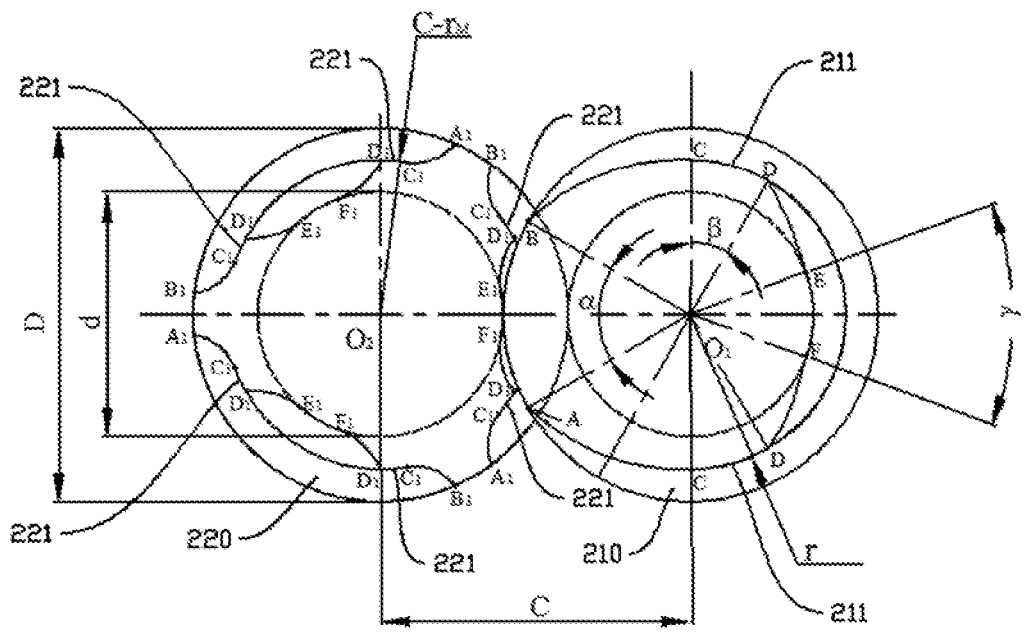
FIG. 7 is a schematic view of the cross-sectional profile of an extrusion device (except the barrel) with a rotation speed ratio of 3:1 and an axially fully open screw groove according to an embodiment of the first aspect of the present disclosure.
Figure 9:
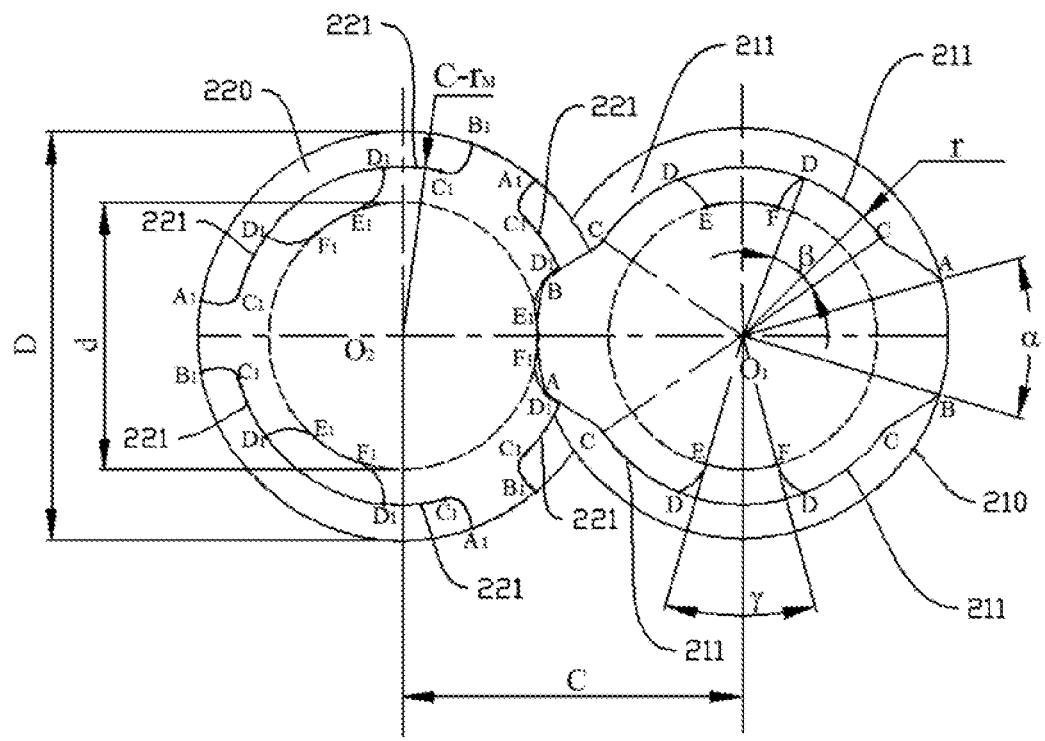
FIG. 9 is a schematic view of the cross-sectional profile of an extrusion device (except the barrel) with a rotation speed ratio of 3:2 and an axially fully open screw groove according to an embodiment of the first aspect of the present disclosure.

In some embodiments of the present disclosure, in order to realize the axially fully open screw groove, increase the axial mixing and adaptive melting ability, generally, a first intermediate circular arc structure 211 is provided on both sides of the crest diameter of the first screw 210, a second intermediate circular arc structure 221 corresponding to the first intermediate circular arc structure 211 is provided on both sides of the crest diameter of the second screw 220. Referring to FIG. 5, FIG. 7 and FIG. 9 which show the cross-sectional profiles of the first screw 210 and the second screw 220, where C is a distance of the connection line between rotation center $O_1$ of the first screw 210 and rotation center $O_2$ of the second screw 220. The crest diameters of the first screw 210 and the second screw 220 are both D, and the corresponding radius is R, the root diameters of the first screw 210 and the second screw 220 are both d, and the corresponding radius is r, then r=C−R. The first screw 210 is connected with $2N_2$ first intermediate circular arc structures 211 between the root diameter and the crest diameter, that is, the first screw 210 is connected with a first intermediate circular arc structure 211 on both sides of the crest diameter, let the radius corresponding to the first intermediate circular arc structure 211 be $r_M$, $r<r_M<R$. $2N_1$ second intermediate circular arc structures 221 corresponding to the first intermediate circular arc structure 211 are introduced into the cross-sectional profile of the second screw 220, and the radius corresponding to the second intermediate circular arc structure 221 is $C-r_M$. At this time, the cross-sectional profile of the first screw 210 is composed of $8N_2$ curved arcs; the cross-sectional profile of the second screw 220 is composed of $8N_1$ curved arcs.

$8N_2$ curved arcs of the cross-sectional profile of the first screw 210 includes $N_2$ circular arcs AB, $N_2$ circular arcs EF, $2N_2$ circular arcs CD, and $2N_2$ non-circular arcs ED connecting circular arc EF and circular arc CD, $2N_2$ non-circular arcs CB connecting circular arc CD and circular arc AB; diameters corresponding to AB, CD and EF are R, $r_M$ and r, and central angles corresponding to AB, CD and EF are α, β, and γ, respectively, parameters $\emptyset_1, \emptyset_2$ are given, then $\emptyset_1, \emptyset_2$ satisfy the following relational expressions:

$$\emptyset_1 = \frac{N_1}{N_2}\arccos\left(\frac{C^2 + R^2 - r_M^2}{2CR}\right) - a c r \sin\frac{\sqrt{4C^2R^2 - (C^2 + R^2 - r_M^2)^2}}{2Cr_M},$$

-continued
$$\emptyset_2 = \frac{N_1}{N_2} arcos\left(\frac{(C+R)r + (C-r_M)^2}{2C(C-r_M)}\right) - acrsin\frac{\sqrt{4C^2(C-r_M)^2 - (C^2 - R^2 + (C-r_M)^2)^2}}{2CR},$$

the central angles α, β, and γ satisfy the following relational expression:

$$\alpha + 2\beta + \gamma = \frac{2\pi}{N_2} - 2\emptyset_1 - 2\emptyset_2.$$

For the non-circular curved arc ED, by taking $O_1E$ as a polar radius, introducing an auxiliary angle $t_1$ is introduced, and taking the counterclockwise direction as a positive direction, the polar angle $\theta_1(t)$ of the non-circular curved arc ED is expressed as:

$$\theta_1(t_1) = N_1 t_1 - \arcsin\left(\frac{R\sin(N_2 t_1)}{\sqrt{C^2 + R^2 - 2CR\cos(N_2 t_1)}}\right),$$

the corresponding polar radius $\rho_1(t_1)$ is:

$$\rho_1(t_1) = \sqrt{C^2 + R^2 - 2CR\cos(N_2 t_1)}, \text{ where,}$$
$$0 \le t_1 \le \frac{1}{N_2}\arccos\left(\frac{C^2 + R^2 - r_M^2}{2CR}\right).$$

For the non-circular arc CB, by taking $O_1C$ as a polar radius, introducing an auxiliary angle $\varepsilon_2(t_2)$, and taking the counterclockwise direction as a positive direction, the polar angle $\theta_2(t_2)$ of the non-circular curved arc CB is:

$$\theta_2(t_2) = N_1 t_2 - \arcsin\left(\frac{(C-r_M)\sin(N_2 t_2)}{\sqrt{C^2 + (C-r_M)^2 - 2C(C-r_M)\cos(N_2 t_2)}}\right),$$

the corresponding polar radius $\beta_2(t_2)$ is:

$$\rho_2(t_2) = \sqrt{C^2 + (C-r_M)^2 - 2C(C-r_M)\cos(N_2 t_2)}, \text{ where,}$$
$$0 \le t_2 \le \frac{1}{N_2}arcos\left(\frac{(C+r)r + (C-r_M)^2}{2C(C-r_M)}\right).$$

Correspondingly, the $8N_1$ curved arcs of the cross-sectional profile of the second screw 220 includes $N_1$ circular arcs $A_1B_1$, $N_1$ circular arcs $E_1F_1$, $2N_1$ circular arcs $C_1D_1$, $2N_1$ non-circular arcs $E_1D_1$ connecting circular arcs $E_1F_1$ and circular arcs $C_1D_1$, $2N_2$ non-circular arcs $C_1B_1$ connecting circular arcs $C_1D_1$ and circular arcs $A_1B_1$, corresponding diameters of $A_1B_1$, $C_1D_1$ and $E_1F_1$ are R, $C-r_M$ and r, central angles corresponding to $A_1B_1$, $C_1D_1$ and $E_1F_1$ are respectively $$\frac{\alpha N_2}{N_1}, \frac{\beta N_2}{N_1} \text{ and } \frac{\gamma N_2}{N_1}.$$

For the non-circular arc $E_1D_1$, by taking $O_2E_1$ as a polar radius, introducing an auxiliary angle $t_3$, and taking the counterclockwise direction as a positive direction, the polar angle $\theta_3$ ($t_3$) of the non-circular arc $E_1D_1$ is expressed as:

$$\theta_3(t_3) = \arcsin\left(\frac{R\sin(N_1 t_3)}{\sqrt{C^2 + R^2 - 2CR\cos(N_1 t_3)}}\right) - N_2 t_3,$$

the corresponding polar radius $\beta_3(t_3)$ is:

$$\rho_3(t_3) = \sqrt{C^2 + R^2 - 2CR\cos(N_1 t_3)}, \text{ where,}$$

$$0 \le t_3 \le \frac{1}{N_1}\arccos\left(\frac{C^2 + R^2 - r_M^2}{2CR}\right).$$

For non-circular curved arc $C_1B_1$, by taking $O_2C_1$ as a polar radius, introducing an auxiliary angle $t_4$, and taking the counterclockwise direction as a positive direction, the polar angle $\theta_4(t_4)$ of the non-circular curved arc $C_1B_1$ is expressed as:

$$\theta_4(t_4) = \arcsin\left(\frac{r_M\sin(N_1 t_4)}{\sqrt{C^2 + r_M^2 - 2Cr_M\cos(N_1 t_4)}}\right) - N_2 t_4,$$

the corresponding polar radius $\rho_4(t_4)$ is:

$$\rho_4(t_4) = \sqrt{C^2 + r_M^2 - 2Cr_M\cos(N_1 t_4)}, \text{ where,}$$

$$0 \le t_4 \le \frac{1}{N_1}\arccos\left(\frac{(C+R) - r_M^2}{2Cr_M}\right).$$

Figure 6:
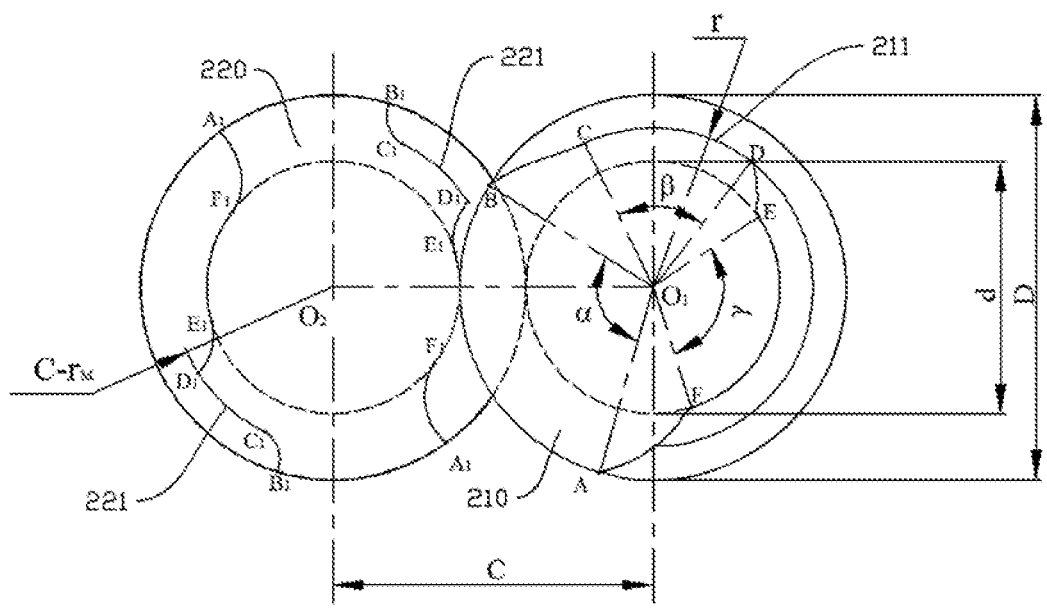
FIG. 6 is a schematic view of the cross-sectional profile of an extrusion device (except the barrel) with a rotation speed ratio of 2:1 and an axially closed screw groove according to an embodiment of the first aspect of the present disclosure.
Figure 8:
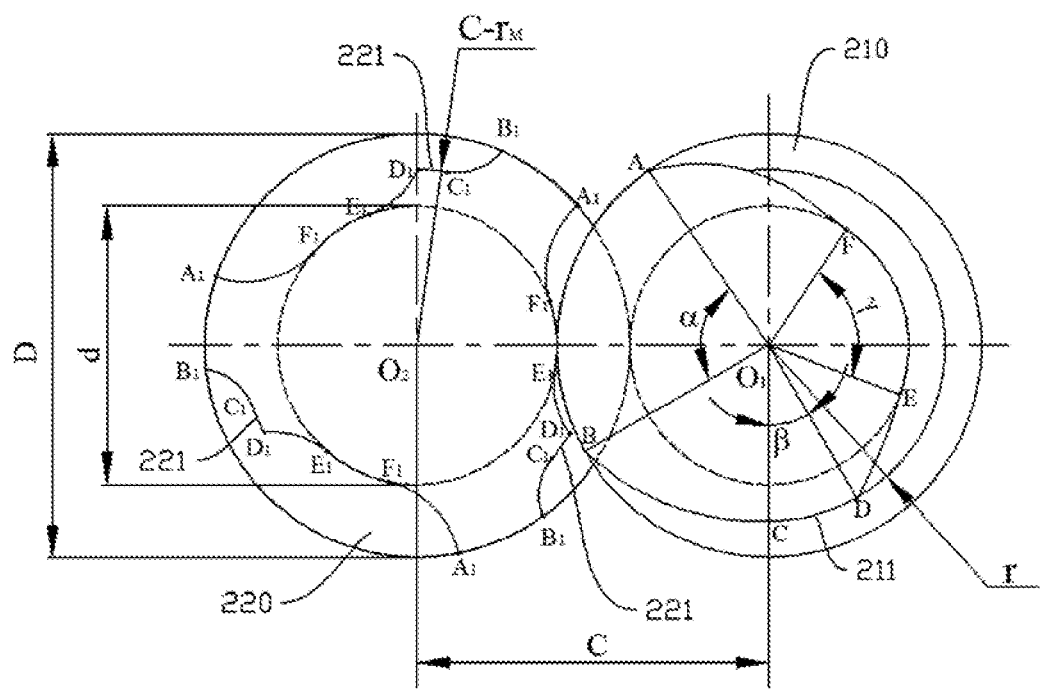
FIG. 8 is a schematic view of the cross-sectional profile of an extrusion device (except the barrel) with a rotation speed ratio of 3:1 and an axially closed screw groove according to an embodiment of the first aspect of the present disclosure.
Figure 10:
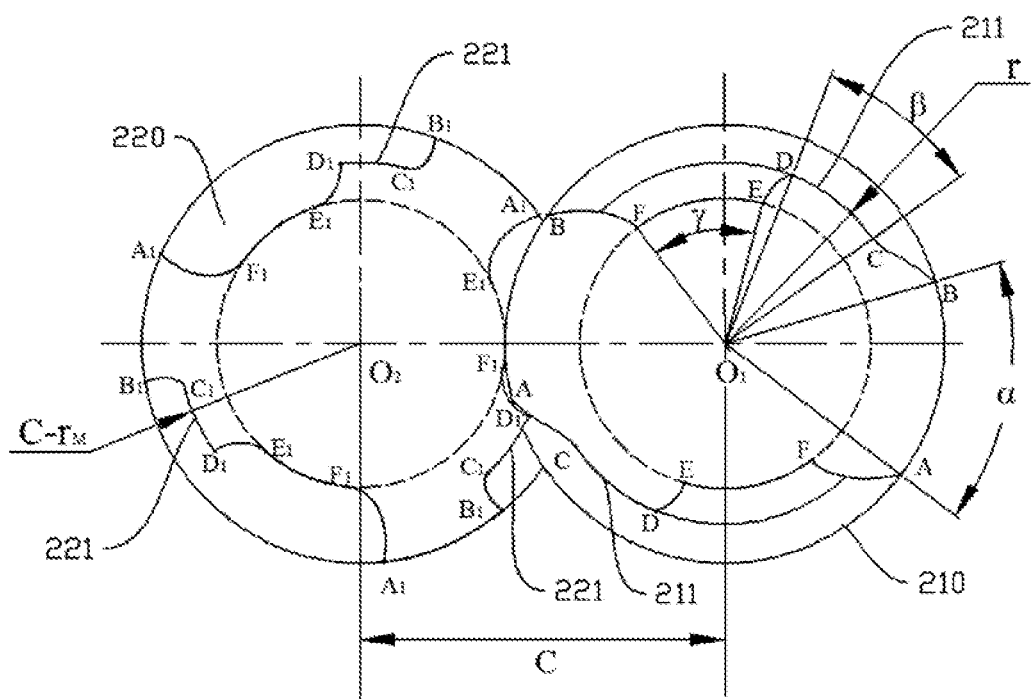
FIG. 10 is a schematic view of the cross-sectional profile of an extrusion device (except the barrel) with a rotation speed ratio of 2:1 and an axially closed screw groove according to an embodiment of the first aspect of the present disclosure.

In some embodiments of the present disclosure, in order to realize the axially closed screw groove and improve the positive displacement conveying capacity, the crest diameter of the first screw 210 is provided with a first intermediate circular arc structure 211 on only one side, a side of the crest diameter of the second screw 220 corresponding to the first intermediate circular arc structure 211 is provided with a second intermediate circular arc structure 221. Referring to FIGS. 6, 8 and 10 which show the cross-sectional profiles of the first screw 210 and the second screw 220, where C is a distance of the connection line between rotation center $O_1$ of the first screw 210 and rotation center $O_2$ of the second screw 220. The crest diameters of the first screw 210 and the second screw 220 are both D, the corresponding radius is R; the root diameters of the first screw 210 and the second screw 220 are both d, and the corresponding radius is r, then r=C−R. The root diameter and crest diameter of the first screw 210 are connected by $N_2$ first intermediate circular arc structure 211, that is, the crest diameter of the first screw 210 is connected with the first intermediate circular arc structure 211 only on one side, and the other side is directly connected to the root diameter through a non-circular arc, the radius corresponding to the first intermediate circular arc structure 211 is $r_M$, r<$r_M$<R. The arc radius corresponding to the $N_1$ second intermediate circular arc structure 221 introduced in the cross-sectional profile of the second screw 220 is C−$r_M$. At this time, the cross-sectional profile of the first screw 210 is composed of $6N_2$ curved arcs; the cross-sectional profile of the second screw 220 is composed of $6N_1$ curved arcs.

$6N_2$ circular arcs of the cross-sectional profile of the first screw 210 includes $N_2$ circular arcs AB, $N_2$ circular arcs EF, $N_2$ circular arcs CD, $N_2$ non-circular arcs ED connecting circular arc EF and circular arc CD, $N_2$ non-circular arcs CB connecting circular arc CD and circular arc AB, $N_2$ non-circular arcs FA connecting circular arc EF and circular arc AB; diameters corresponding to AB, CD and EF are R, $r_M$ and r, and central angles corresponding to AB, CD and EF are α, β, and γ, respectively, parameters $Ø_1$、$Ø_2$、$Ø_3$ are given, the $Ø_1$、$Ø_2$、$Ø_3$ satisfy the following relational expression:

$$\emptyset_1 = \frac{N_1}{N_2}\arccos\left(\frac{C^2 + R^2 - r_M^2}{2CR}\right) - \arcsin\frac{\sqrt{4C^2R^2 - (C^2 + R^2 - r_M^2)^2}}{2Cr_M};$$

$$\emptyset_2 = \frac{N_1}{N_2}arcos\left(\frac{(C+R)r + (C-r_M)^2}{2C(C-r_M)}\right) -$$
$$arcsin\frac{\sqrt{4C^2(C-r_M)^2 - (C^2 - R^2 + (C-r_M)^2)^2}}{2CR};$$

$$\emptyset_3 = \frac{N_1}{N_2}arcos\left(\frac{C}{2R}\right) - arcsin\frac{\sqrt{4R^2 - C^2}}{2R}.$$

The central angles α, β, and γ satisfy the following relational expression:

$$\alpha + \beta + \gamma = \frac{2\pi}{N_2} - \emptyset_1 - \emptyset_2 - \emptyset_3.$$

For the non-circular curved arc ED, by taking $O_1E$ as a polar radius, introducing an auxiliary angle $t_1$, and taking the counterclockwise direction as a positive direction, the polar angle $\theta_1(t)$ of the non-circular curved arc ED is:

$$\theta_1(t_1) = N_1 t_1 - \arcsin\left(\frac{R\sin(N_2 t_1)}{\sqrt{C^2 + R^2 - 2CR\cos(N_2 t_1)}}\right),$$

the corresponding polar radius $\rho_1(t_1)$ is:

$$\rho_1(t_1) = \sqrt{C^2 + R^2 - 2CR\cos(N_2 t_1)}, \text{ where,}$$

$$0 \le t_1 \le \frac{1}{N_2}\arccos\left(\frac{C^2 + R^2 - r_M^2}{2CR}\right).$$

For the non-circular arc CB, by taking $O_1C$ as a polar radius, introducing an auxiliary angle $\varepsilon_2(t_2)$, and taking the counterclockwise direction as a positive direction, the polar angle $\theta_2$ ($t_2$) of the non-circular arc CB is:

$$\theta_2(t_2) = N_1 t_2 - \arcsin\left(\frac{(C-r_M)\sin(N_2 t_2)}{\sqrt{C^2 + (C-R_M)^2 - 2C(C-r_M)\cos(N_2 t_2)}}\right),$$

the corresponding polar radius $\rho_2(t_2)$ is:

$$\rho_2(t_2) = \sqrt{C^2 + (C-r_M)^2 - 2C(C-r_M)\cos(N_2 t_2)}, \text{ where,}$$

$$0 \le t_2 \le \frac{1}{N_2}arcos\left(\frac{(C+R)r + (C-r_M)^2 - r_M^2}{2C(C-r_M)}\right).$$

For the non-circular arc FA, by taking $O_1F$ as a polar radius, introducing an auxiliary angle $t_3$, and taking the counterclockwise direction as a positive direction, the polar angle $\theta_3(t_3)$ of the non-circular arc FA is:

$$\theta_3(t_3) = N_1 t_3 - \arcsin\left(\frac{R\sin(N_2 t_3)}{\sqrt{C^2 + R^2 - 2CR\cos(N_2 t_3)}}\right),$$

the corresponding polar radius $\rho_3(t_3)$ is:

$$\rho_3(t_3) = \sqrt{C^2 + R^2 - 2CR\cos(N_2 t_3)}, \text{ where,}$$

$$0 \leq t_3 \leq \frac{1}{N_2}\arccos\left(\frac{C}{2R}\right).$$

$6N_1$ curved arcs of the cross-sectional profile of the second screw 220 include $N_1$ circular arcs $A_1B_1$, $N_1$ circular arcs $E_1F_1$, $N_1$ circular arcs $C_1D_1$, $N_1$ non-circular circular arcs $E_1D_1$ connecting circular arcs $E_1F_1$ and circular arcs $C_1D_1$, $N_2$ non-circular circular arcs $C_1B_1$ connecting circular arcs $C_1D_1$ and circular arcs $A_1B_1$, $N_1$ non-circular arcs $F_1A_1$ connecting arcs $E_1F_1$ and arcs $A_1B_1$, corresponding diameters of $A_1B_1$, $C_1D_1$ and $E_1F_1$ are R, C–$r_M$ and r, central angles corresponding to $A_1B_1$, $C_1D_1$ and $E_1F_1$ are respectively $$\frac{\alpha N_2}{N_1}, \frac{\beta N_2}{N_1} \text{ and } \frac{\gamma N_2}{N_1}.$$

For the non-circular arc $E_1D_1$, by taking $O_2E_1$ as a polar radius, introducing an auxiliary angle $t_4$, and taking the counterclockwise direction as a positive direction, the polar angle $\theta_4(t_4)$ of the non-circular arc E1D1 is:

$$\theta_4(t_4) = \arcsin\left(\frac{R\sin(N_1 t_4)}{\sqrt{C^2 + R^2 - 2CR\cos(N_1 t_4)}}\right) - N_2 t_4,$$

the corresponding polar radius $\rho_4(t_4)$ is:

$$\rho_4(t_4) = \sqrt{C^2 + R^2 - 2CR\cos(N_1 t_4)}, \text{ where,}$$

$$0 \leq t_4 \leq \frac{1}{N_1}\arccos\left(\frac{C^2 + R^2 - r_M^2}{2CR}\right).$$

For the non-circular curved arc $C_1B_1$, by taking $O_2C_1$ as a polar radius, introducing an auxiliary angle $t_5$, and taking the counterclockwise direction as a positive direction, the polar angle $\theta_5(t_5)$ of the non-circular arc $C_1B_1$ is:

$$\theta_5(t_5) = \arcsin\left(\frac{r_M \sin(N_1 t_5)}{\sqrt{C^2 + r_M^2 - 2Cr_M \cos(N_1 t_5)}}\right) - N_2 t_5,$$

the corresponding polar radius $\rho_5(t_5)$ is:

$$\rho_5(t_5) = \sqrt{C^2 + r_M^2 - 2Cr_M \cos(N_1 t_5)},$$

$$\text{where, } 0 \leq t_5 \leq \frac{1}{N_1}\arccos\left(\frac{(C+R)r + r_M^2}{2Cr_M}\right).$$

For the non-circular curved arc $F_1A_1$, by taking $O_2F_1$ as a polar radius, introducing an auxiliary angle $t_6$, and taking the counterclockwise direction as a positive direction, the polar angle $\theta_6(t_6)$ of the non-circular arc $F_1A_1$ is:

$$\theta_6(t_6) = \arcsin\left(\frac{R\sin(N_1 t_6)}{\sqrt{C^2 + R^2 - 2CR\cos(N_1 t_6)}}\right) - N_2 t_6,$$

the corresponding polar radius $\rho_6(t_6)$ is:

$$\rho_6(t_6) = \sqrt{C^2 + R^2 - 2CR\cos(N_1 t_6)},$$

$$\text{where, } 0 \leq t_6 \leq \frac{1}{N_1}\arccos\left(\frac{C}{2R}\right).$$

In some embodiments of the present disclosure, referring to FIGS. 3 and 4, the crest diameters of the first screw 210 and the second screw 220 are both tangent to the inner cavity wall of the barrel 100. The root diameter and crest diameter of the first screw 210 are equal to the root diameter and crest diameter of the second screw 220. This can bring greater disturbance and mixing effect.

In some embodiments of the present disclosure, referring to FIGS. 3 and 4, the first screw 210, the second screw 220 and the barrel 100 form a flow channel 30 for the passage of materials.

In some embodiments of the present disclosure, referring to FIG. 4, the screw mechanism 200 divides the inner cavity of the barrel 100 into a conveying section 110, a melting section 120, an exhaust section 130, and a mixing and extrusion section 140 in sequence. The barrel 100 is provided with a feed port 111 corresponding to the conveying section 110, an exhaust port 131 corresponding to the exhaust section 130, and a discharge port 141 corresponding to an end of the mixing and extrusion section 140.

In the conveying section 110, the first screw 210 and the second screw 220 respectively rotate in different directions along the respective screw axes, thereby generating a conveying force. At the same time, the cylindrical surface swept by the first intermediate circular arc structure 211 of the first screw 210 meshes with the cylindrical surface swept by the corresponding second intermediate circular arc structure 221 of the second screw 220, the screw grooves of the two screws form an open structure, forming an "8" shaped chamber positive displacement conveying unit, which increases the axial positive displacement conveying force. The materials moves in the direction of the melting section 120 under the combined action of the positive displacement conveying force and the friction force between the two screws.

In the melting section 120, the first screw 210 and the second screw 220 form a mixing and kneading pool in the upper and lower meshing zones, under the action of positive displacement of the first screw 210 and the second screw 220, the unmelted materials advances along the screw groove axis at a faster speed than the melt, in this way, the melting and mixing are strengthened, an adaptive melting mechanism is formed, the heat transfer process is strengthened, and the melting process of solid materials is accelerated, so that the materials eventually become melts, which will be pushed into the exhaust section 130 by the first screw 210 and the second screw 220. If the heat generated by the high speed rotation of the first screw 210 and the second screw 220 is insufficient to melt the material, external heating means may be introduced in the melting section 120 to assist in heating and melting.

In the exhaust section 130, the pushing and scraping action formed by the meshing of the first intermediate circular arc structure 211 and the second intermediate circular arc structure 221 promotes the interface renewal and expands the exhaust zone, the collection of materials creates a negative pressure here, which accelerates the exhaust gas discharged from the exhaust port 131. At the same time, the materials will be pushed into the mixing and extrusion section 140 by the first screw 210 and the second screw 220. In the mixing and extrusion section 140, the first screw 210 and the second screw 220 counter-rotate in differential speeds, meanwhile, because of the existence of the first intermediate circular arc structure 211 and the second intermediate circular arc structure 221, the first screw 210 and the second screw 220 have better pressure-building ability and extrusion characteristics, and, which also strengthens the mixing and plasticizing effect, so that the melted materials can be stably extruded from the discharge port 141.

Figure 11:
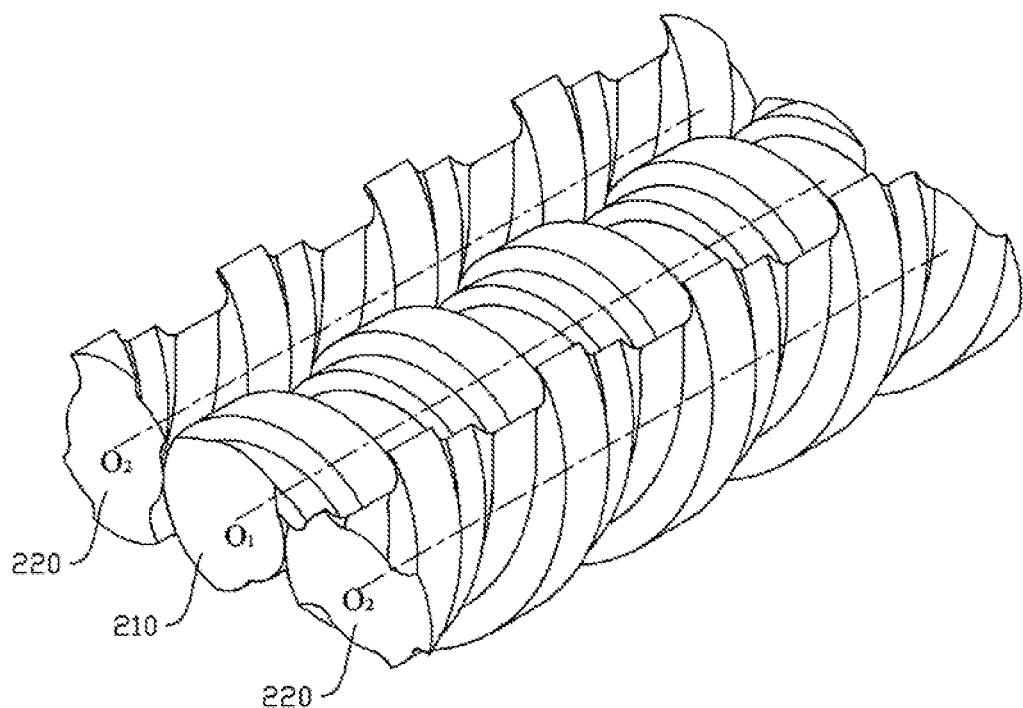
FIG. 11 is a schematic diagram of a three-screw structure (one fast and two slow) according to an embodiment of the first aspect of the present disclosure.
Figure 12:
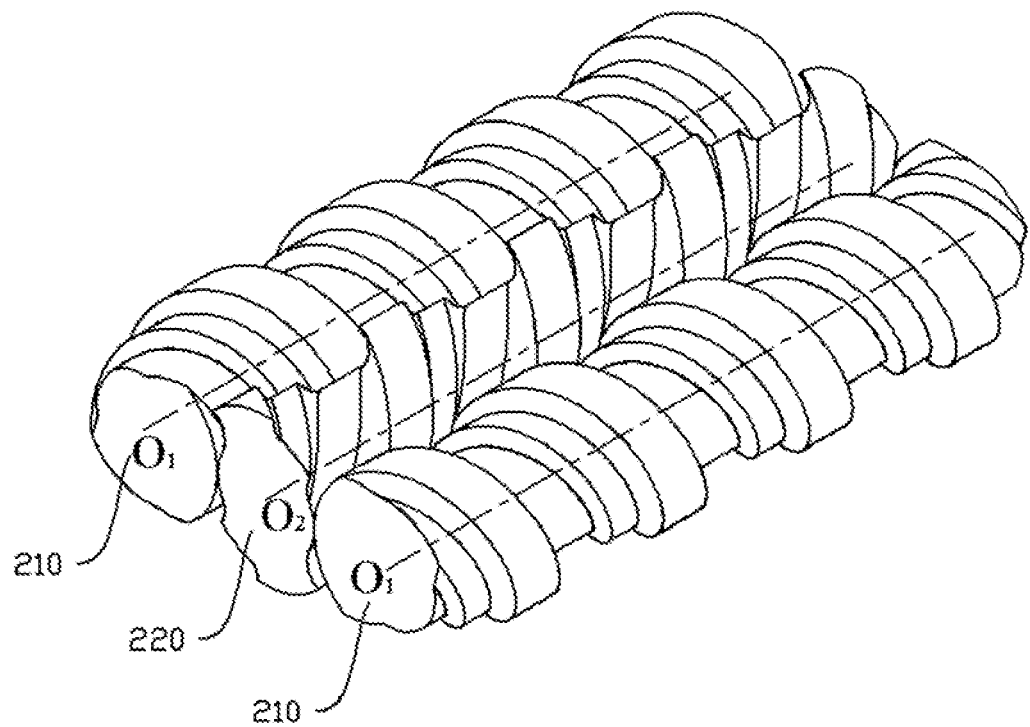
FIG. 12 is a schematic diagram of a three-screw structure (one slow and two fast) according to an embodiment of the first aspect of the present disclosure.

In some embodiments of the present disclosure, the screw mechanism 200 further includes a third screw with the same structure as the first screw 210, the third screw and the second screw 220 are always in mesh with each other, the third screw has the same rotation direction as the first screw 210. The use of a three-screw structure can bring greater extrusion effects and greater extrusion efficiency. Because the first screw 210 and the second screw 220 themselves are not specifically limited, therefore, the third screw may be substantially the same as the first screw 210 or the second screw 220. If it is the same as the first screw 210, it meshes with the second screw 220, and if it is the same as the second screw 220, it meshes with the first screw 210. FIGS. 11 and 12 are schematic diagrams of the three-screw mechanism 200. Generally, the first screw 210, the second screw, and the third screw are arranged in an "in-line shape" and meshed according to the meshing situation.

In some embodiments of the present disclosure, both the first screw 210 and the second screw 220 adopt a tapered structure. Adopting conical structure can provide stronger mixing and greater extrusion output.

According to an embodiment of a second aspect of the present disclosure, a counter-rotating extruder includes the counter-rotating differential speed extrusion device of any one of the above embodiment.

The counter-rotating extruder according to the embodiment of the present disclosure realizes, by using the counter-rotating differential speed extrusion device, the self-cleaning during the processing and enhances the disturbance effect, thus can effectively strengthen the melt plasticization and also have a more stable pressure building capability. In addition, through the counter-rotating differential speed extrusion device, the unmelted materials can be pushed forward at a faster speed than the melt under the action of positive displacement movement, and participates in the stirring process, thereby strengthening the melting and mixing, forming an adaptive melting mechanism, effectively improving the processing flexibility of the screws.

According to an embodiment of a third aspect of the present disclosure, a method for manufacturing materials includes: adding materials; counter-rotating the first screw and the second screw in differential speeds, and advancing the materials through the first screw and the second screw; melting the materials by heat generated by the rotation of the first screw and the second screw and external heating to make the materials form a melt; stretching, compressing and kneading the melt through the first screw, the second screw, and the barrel to form a final target product.

The method for manufacturing materials according to the embodiment of the present disclosure has at least the following technical effects: through the counter rotation of the first screw and the second screw, materials can be automatically pushed forward, at the same time, because of the specificity of the first screw and the second screw, the unmelted materials can be pushed forward along the groove axis at a faster speed than the melt under the action of positive displacement movement, and participates in the stirring process, thereby strengthening the plasticization and kneading and make the extrusion of the melted materials stable. At the same time, the differential rotation between the first screw and the second screw also achieves better self-cleaning.

In the description of this specification, the descriptions of the terms "one embodiment", "some embodiments", "exemplary embodiments", "examples", "specific examples", or "some examples" and the like mean in connection with specific features, structures, materials or characteristics described in the embodiments or examples are included in at least one embodiment or example of the present disclosure. In this specification, the schematic expressions of the above terms do not necessarily refer to the same embodiment or example. Moreover, the specific features, structures, materials, or characteristics described may be combined in any suitable manner in any one or more embodiments or examples.

Although embodiments of the present disclosure have been shown and described, those skilled in the art can understand that various changes, modifications, substitutions, and alterations can be made to these embodiments without departing from the principle and concept of the present disclosure, and the scope of the present disclosure is defined by the claims and their equivalents.

We claim:

1. A counter-rotating differential speed extrusion device, comprising a barrel and a screw mechanism arranged in the barrel, the screw mechanism comprising a first screw and a second screw,
   wherein a crest diameter and a root diameter of the first screw are respectively meshed with a root diameter and a crest diameter of the second screw; the first screw and the second screw are configured for counter-rotating in differential speeds at a fixed rotation speed ratio;
   at least one first intermediate circular arc structure is provided between the root diameter and the crest diameter of the first screw, a second intermediate circular arc structure that is tangent to the first intermediate circular arc structure is provided between the root diameter and the crest diameter of the second screw;
   a trend of the first intermediate circular arc structure is consistent with a thread trend of the crest diameter and the root diameter of the first screw;
   a trend of the second intermediate circular arc structure is consistent with a thread trend of the root diameter and the crest diameter of the second screw;
   wherein the first intermediate circular arc structure is disposed on one side or both sides of the crest diameter of the first screw, and the second intermediate circular arc structure is also disposed on one side or both sides of the crest diameter of the second screw;

the first intermediate circular arc structure and the second intermediate circular arc structure are jointly used to open a screw groove of the first screw and a screw groove of the second screw to each other, and form an "8"-shaped chamber positive displacement conveying unit.

2. The counter-rotating differential speed extrusion device of claim 1, wherein a rotation speed of the first screw is $N_1$, a rotation speed of the second screw is $N_2$, and $N_1$ and $N_2$ are positive integers that are relatively prime;

in each cross section of the screw mechanism, a cross-sectional profile of the first screw and a cross-sectional profile of the second screw comprise multiple continuous curved arcs, and a number ratio of the curved arcs of the cross-sectional profile of the first screw and the curved arcs of the cross-sectional profile of the second screw is inversely proportional to the rotation speed ratio.

3. The counter-rotating differential speed extrusion device of claim 2, wherein the first intermediate circular arc structure is provided on both sides of the crest diameter of the first screw, the second intermediate circular arc structure is provided on both sides of the crest diameter of the second screw;

the cross-sectional profile of the first screw is composed of $8N_2$ curved arcs;

the cross-sectional profile of the second screw is composed of $8N_1$ curved arcs;

$8N_2$ curved arcs of the cross-sectional profile of the first screw comprises $N_2$ circular arcs AB, $N_2$ circular arcs EF, $2N_2$ circular arcs CD, and $2N_2$ non-circular arcs ED connecting circular arc EF and circular arc CD, $2N_2$ non-circular arcs CB connecting circular arc CD and circular arc AB; diameters corresponding to AB, CD and EF are R, $r_M$ and r, C is a distance of a connecting line between a rotation center of the first screw and a rotation center of the second screw, and central angles corresponding to AB, CD and EF are α, β, and γ, respectively, parameters $\theta_1, \theta_2$ are given, then $\theta_1, \theta_2$ satisfy the following relational expressions:

$$\phi_1 = \frac{N_1}{N_2}\arccos\left(\frac{C^2+R^2-r_M^2}{2CR}\right) - \arcsin\frac{\sqrt{4C^2R^2-(C^2+R^2-r_M^2)^2}}{2Cr_M},$$

$$\phi_2 = \frac{N_1}{N_2}arcos\left(\frac{(C+R)r+(C-r_M)^2}{2C(C-r_M)}\right) -$$

$$arcsin\frac{\sqrt{4C^2(C-r_M)^2-(C^2-R^2+(C-r_M)^2)^2}}{2CR},$$

the central angles α, β, and γ satisfy the following relational expression:

$$\alpha + 2\beta + \gamma = \frac{2\pi}{N_2} - 2\phi_1 - 2\phi_2,$$

$8N_1$ curved arcs of the cross-sectional profile of the second screw comprises $N_1$ circular arcs $A_1B_1$, $N_1$ circular arcs $E_1F_1$, $2N_1$ circular arcs $C_1D_1$, $2N_2$ non-circular arcs $E_1D_1$ connecting circular arcs $E_1F_1$ and circular arcs $C_1D_1$, $2N_2$ non-circular arcs $C_1B_1$ connecting circular arcs $C_1D_1$ and circular arcs $A_1B_1$, diameters corresponding to $A_1B_1$, $C_1D_1$ and $E_1F_1$ are R, $C-r_m$ and r, central angles corresponding to $A_1B_1$, $$\frac{\alpha N_2}{N_1}, \frac{\beta N_2}{N_1} \text{ and } \frac{\gamma N_2}{N_1}.$$

$C_1D_1$ and $E_1F_1$ are respectively.

4. The counter-rotating differential speed extrusion device of claim 2, wherein the first intermediate circular arc structure is provided on one side of the crest diameter of the first screw, the second intermediate circular arc structure is provided on a side of the crest diameter of the second screw corresponding to the first intermediate circular arc structure;

the cross-sectional profile of the first screw is composed of $6N_2$ curved arcs; the cross-sectional profile of the second screw is composed of $6N_1$ curved arcs;

$6N_2$ circular arcs of the cross-sectional profile of the first screw comprises $N_2$ circular arcs AB, $N_2$ circular arcs EF, $N_2$ circular arcs CD, $N_2$ non-circular arcs ED connecting circular arc EF and circular arc CD, $N_2$ non-circular arcs CB connecting circular arc CD and circular arc AB, $N_2$ non-circular arcs FA connecting circular arc EF and circular arc AB; diameters corresponding to AB, CD and EF are R, $r_M$, and r, and central angles corresponding to AB, CD and EF are α, β, and γ, respectively, C is a distance of a connecting line between a rotation center of the first screw and a rotation center of the second screw, parameters $\theta_1, \theta_2, \theta_3$ are given, then $\theta_1, \theta_2, \theta_3$ satisfy the following relational expression:

$$\phi_1 = \frac{N_1}{N_2}\arccos\left(\frac{C^2+R^2-r_M^2}{2CR}\right) - \arcsin\frac{\sqrt{4C^2R^2-(C^2+R^2-r_M^2)^2}}{2Cr_M},$$

$$\phi_2 = \frac{N_1}{N_2}arcos\left(\frac{(C+R)r+(C-r_M)^2}{2C(C-r_M)}\right) -$$

$$arcsin\frac{\sqrt{4C^2(C-r_M)^2-(C^2-R^2+(C-r_M)^2)^2}}{2CR},$$

$$\phi_3 = \frac{N_1}{N_2}arcos\left(\frac{C}{2R}\right) - arcsin\frac{\sqrt{4R^2-C^2}}{2R},$$

the central angles α, β, and γ satisfy the following relational expression:

$$\alpha + \beta + \gamma = \frac{2\pi}{N_2} - \phi_1 - \phi_2 - \phi_3,$$

$6N_1$ curved arcs of the cross-sectional profile of the second screw comprise $N_1$ circular arcs $A_1 B_1$, $N_1$ circular arcs $E_1 F_1$, $N_1$ circular arcs $C_1 D_1$, $N_1$ non-circular circular arcs $E_1D_1$ connecting circular arcs $E_1F_1$ and circular arcs $C_1D_1$, $N_2$ non-circular circular arcs $C_1B_1$ connecting circular arcs $C_1D_1$ and circular arcs $A_1B_1$, $N_1$ non-circular arcs $F_1A_1$ connecting arcs $E_1F_1$ and arcs $A_1 B_1$, diameters corresponding to $A_1 B_1$, $C_1 D_1$ and $E_1 F_1$ are R, $C-r_M$ and r, central angles $$\frac{\alpha N_2}{N_1}, \frac{\beta N_2}{N_1} \text{ and } \frac{\gamma N_2}{N_1}.$$

corresponding to $A_1 B_1$, $C_1 D_1$ and $E_1 F_1$ are respectively.

5. The counter-rotating differential speed extrusion device of claim 1, wherein the crest diameters of the first screw and the second screw are both tangent to a wall of an inner cavity of the barrel.

6. The counter-rotating differential speed extrusion device of claim 1, wherein the screw mechanism sequentially divides the inner cavity of the barrel into a conveying section, a melting section, an exhaust section, and a mixing and extrusion section; the barrel is provided with a feed port corresponding to the conveying section, an exhaust port corresponding to the exhaust section, a discharge port corresponding to an end of the mixing and extrusion section.

7. The counter-rotating differential speed extrusion device of claim 1, wherein the screw mechanism further comprises a third screw having a same structure as the first screw, the third screw and the second screw are meshed with each other; the third screw and the first screw have a same rotating direction.

8. The counter-rotating differential speed extrusion device of claim 1, wherein both the first screw and the second screw adopt a tapered structure.

9. A method for manufacturing materials using the counter-rotating differential speed extrusion device of claim 1, comprising:
- adding materials;
- counter-rotating the first screw and the second screw in differential speeds, and advancing the materials through the first screw and the second screw;
- melting the materials by heat generated by the rotation of the first screw and the second screw and external heating to make the materials form a melt;
- stretching, compressing and kneading the melt through the first screw, the second screw, and the barrel to form a final target product.

* * * * *